Dec. 20, 1960 — L. HALE — 2,965,312
SPRAY GUN
Original Filed July 12, 1955

INVENTOR
LOREN HALE
BY
ATTORNEYS

2,965,312
Patented Dec. 20, 1960

United States Patent Office

2,965,312

SPRAY GUN

Loren Hale, % Refract-All Manufacturing Co., 3703 E. 36th St. N., Tulsa, Okla.

Original application July 12, 1955, Ser. No. 521,509, now Patent No. 2,858,116, dated Oct. 28, 1958. Divided and this application June 23, 1958, Ser. No. 743,675

3 Claims. (Cl. 239—407)

This invention relates to guns for spraying or shooting refractory materials, insulation materials, mortars, plastics and other similar materials and aggregates, this application being a division of my copending application Serial No. 521,509, filed July 12, 1955, now Patent No. 2,858,116, dated October 28, 1958, disclosing and claiming a mixing and material pressurizing machine with which the gun of the present application may be used.

The principal object of the invention is to provide a spray gun which is low in cost of manufacture, efficient in use, and with parts so arranged that parts which become worn through use may readily be removed and reconditioned for further use, or replaced with unused parts.

Other objects and advantages will appear in the following detailed description of a practical embodiment of my invention, taken in connection with the accompanying drawing, forming a part of this specification and in which drawing.

Figure 1:
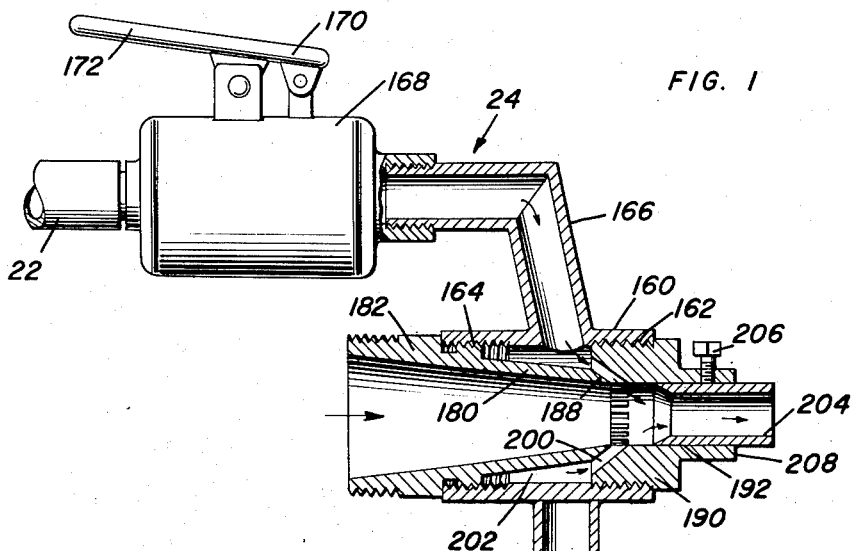
Figure 1 is a side elevational view of the spray gun with certain parts being shown in cross-section.
Figure 2:
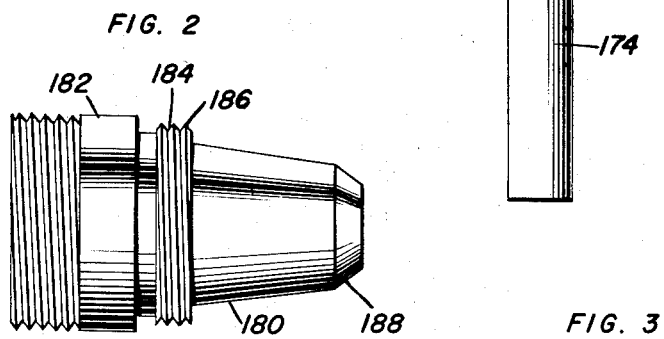
Figure 2 is an enlarged side elevational view of a nozzle portion of the gun.
Figure 3:
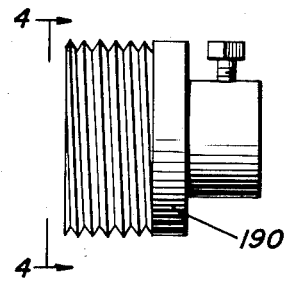
Figure 3 is an enlarged side elevational view of a mixing head of the gun.
Figure 4:
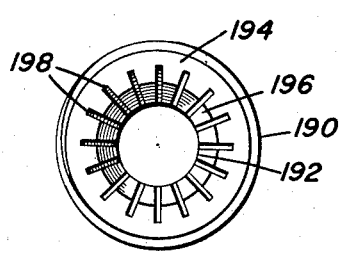
Figure 4 is a rear view taken in the direction of section line 4—4 of Figure 3 showing characteristics of the mixing head.

The spray gun designated generally by the reference character 24, includes a body or sleeve 160 internally threaded, as at 162 and 164, at its opposite end portions. An air conducting tube 166 extends upwardly from the sleeve 160 and opens into the intermediate portion of this sleeve. The free end of the tube 166 is attached to a valve body 168 which is in turn attached to a flexible pneumatic line or hose 22. Any suitable valve means 170 within the valve body may have a finger tip control lever 172 thereon for controlling the amount of air entering the tube 166 and consequently the sleeve 160.

Preferably at a zone diametrically opposite the entrance of the tube 166 into the intermediate portion of the sleeve 160, the sleeve 160 is provided with a steadying handle 174 for grasping by the individual spraying material from the gun.

A tapered nozzle 180 extends from a cylindrical head portion 182 which is threaded onto the end of a flexible hose, not shown in the drawing, through which slurry passes to the gun. A reduced, cylindrical threaded portion 184 is interposed between the tapered nozzle 180 and the hose connecting cylindrical portion 182. This portion is threaded, as at 186, into the threaded end 164 of the sleeve 160. The tapered nozzle 180 provides an annular space 202 within the central portion of the sleeve 160 so that air entering the sleeve through the tube 166 has free passage around the nozzle.

The free end of the tapered nozzle 180 is beveled, as at 188, for a purpose that will become immediately apparent.

A mixing head or bushing 190 is threaded into the threaded end portion 162 of the sleeve 160, the head or bushing having a longitudinal bore 192 therethrough aligning with the tapered bore of the nozzle 180.

The back end wall 194 of the head or bushing 190 has a portion thereof beveled annularly outward from the bore 192, as at 196, at the same angle as the beveled end 188 of the nozzle 180.

Additionally, this rear end wall 194 is provided with a plurality of circumferentially spaced slots 198 providing ports which are cut to the angle of the beveled portion 196 and are spaced circumferentially around the bore 192. Thus, when the nozzle 180 is threaded into place in the sleeve and the head or bushing 190 is threaded into place in the sleeve, the beveled forward end 188 of the nozzle will abut and seat against the beveled portion 196 of the back end wall of the head or bushing 190, as shown in Figure 1. Thus, each slot 198 provides an air space 200 around the annular space 202 provided within the sleeve 160 between the nozzle 180 and the bushing 190 to direct a stream of air toward the center of the bore 192 and outwardly therefrom to mix with slurry or wet mix material passing through the nozzle 180.

This particular arrangement of the wet mix nozzle 180 and the pneumatic gauging head or bushing 190 is extremely effective in controlling the density of the product as it is emitted from the gun 24 since the amount of air under pressure passing through the nozzle can be quickly and easily controlled by operation of the valve handle 172.

To vary the spray pattern in the sense that the same may be confined or spread, a nozzle extension in the form of the extensible tube 204 may be provided and slidably received within the bore 192 of the head or bushing 190, the nozzle extension 204 being held in place by a suitable setscrew 206 threaded through the wall of the reduced forward end portion 208 of the head or bushing 190. In addition, this extension serves to protect the nozzle bushing 190 from the abrading action of the air mixed material.

In this operation, by controlling the opening of the air valve 168 in the spray gun 24, the gun may be adjusted to spray varying distances up to approximately twenty-five feet or greater. Of course, the opening of the valve is determined by the desired spray pattern, distance from the target, density of the wet mix material to be shot.

This spray gun also admits of easy cleaning of the wet mix hose when it is desired to clean the same. To clean this hose, it is simply necessary to press the extreme end of the head or bushing 190, formed by the reduced end portion 208 thereof, or the end of the nozzle extension 204 against a suitable board or the like to seal the same and thence allow air to enter the nozzle and create a back pressure through the hose, thereby forcing material backwardly through the hose and cleaning the hose of any clogged material and also the spray gun 24 of any clogged material which may have formed therein.

There are several advantages resulting from the cutting of the slots 198 in the beveled portion 196 of the mixing head or bushing 190. Among these advantages may be mentioned, first, the wear resulting from any slurry passing through the spray gun, and particularly from any aggregate in the slurry, is at the outward ends of the slots 198 which wear over a long period of use, does not decrease the efficiency of the gun. While there is also some slight wear of the nozzle 180 at its interior tending to slightly enlarge the way through it, such does not decrease the efficiency of the spray gun. I have found it is objectionable to provide the slots in the tapered end 188 of the nozzle because it is desired to keep the weight of the gun to a minimum, so the nozzle wall at its tapered end is relatively thin and not sufficient to have the slots milled or otherwise produced therein. Other advantages resulting from the provision of the slots 198 in the head or bushing 190 are, the ease of cleaning any clogged slots or the replacing of the slotted unit if worn to the extent where its efficiency is impaired, by simply detaching the unit 190 from the sleeve 160 instead of detaching the slurry delivering hose from the nozzle 180 and then removing the nozzle from the sleeve 160.

There is also an advantage in rendering the mixing head or bushing 190 adjustable longitudinally of the gun, such as by the screw threaded engagement of the parts as at 162. By this arrangement the mixing head or bushing may be eased away from seated engagement with the tapered end 188 of the nozzle, enabling the gun to be used for shooting materials a great distance because of the added passageway for a greater volume of air that would otherwise find passage only through the slots at the zone of the forward end of the nozzle and the rearward end of the mixing head or bushing. In practice it has been found that, by thus adjusting the mixing head or bushing 190 so as to be in spaced relationship to the nozzle 180, the material may be shot a distance of twenty five feet or better. This is useful, by way of example, in shooting material upon the back wall of an open hearth furnace.

The extensible tube 204, adjustable longitudinally of the gun enables the user to control the spray pattern, and to operate at a desired distance from the target. For instance, with the tube 204 in an inward position a wide spray pattern results from use of the gun. At a distance of say two feet from the target it is possible to get a pattern twenty-four inches in diameter. By adjusting the tube 204 outwardly, use of the gun at the same distance—two feet from the target—can result in a pattern of about fourteen to eighteen inches in diameter. Since the tube 204 is subjected to considerable wear, it may readily be replaced, when worn to the extent where the operator cannot obtain the desired pattern on the target. This is in contradistinction to making the mixing head or bushing 190 and mixed material exit tube 204 of one piece.

The foregoing is considered as illustrative only of the principle of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

I claim:
1. In a spray gun for shooting slurry such as refractory materials, mortars, aggregates and the like, the combination of a hollow tubular body, a slurry receiving nozzle having a bore mounted at one end of said body and having a beveled discharge end disposed concentrically spaced in said body, a mixing head having a bore mounted at the other end of said body, said mixing head having one end thereof beveled at the same angle as the beveled discharge end of said nozzle and seating against said discharge end of said nozzle, the cooperative seating of said mixing head upon said nozzle defining an annular space within said body, said mixing head having a plurality of ports comprising slots in the beveled end thereof and extending from said annular space to said bore of said mixing head, and an air delivery tube opening into said annular space, said annular space distributing the air that is introduced thereinto circumferentially about said mixing head and through each of said ports at substantially identical volume and pressure.

2. The combination as specified in claim 1 wherein the bore of said nozzle is tapered from the inlet end of said nozzle to the discharge end of said nozzle and wherein the bore of said mixing head is of the same diameter as the bore of the discharge end of said nozzle and said ports terminate circumferentially about the bore of said mixing head and are angularly convergent away from the discharge end of said nozzle, so that slurry introduced into said nozzle will pass therethrough and through said mixing head in an axially unobstructed path and air introduced through said ports will circumferentially contact the slurry and impel the same outwardly from said nozzle.

3. In a spray gun for shooting slurry such as refractory materials, mortars, aggregates and the like, the combination of a hollow tubular body, a slurry receiving nozzle having a bore mounted at one end of said body and having a beveled discharge end disposed concentrically spaced in said body, a mixing head having a bore mounted at the other end of said body, the bore of said nozzle being of the same diameter as the bore of said mixing head and in axial alignment therewith, said mixing head having one end thereof beveled at the same angle as the beveled discharge end of said nozzle and seating against said discharge end of said nozzle, the cooperative seating of said mixing head upon said nozzle defining an annular space within said body, said mixing head having a plurality of ports comprising slots in the beveled end thereof and extending from said annular space to said bore of said mixing head, said slots opening into the bore of said mixing head normal to the axis thereof and extending through said mixing head at the same angle as the beveled end of said nozzle, and an air delivery tube opening into said annular space, said annular space distributing the air that is introduced thereinto circumferentially about said mixing head and through each of said ports at substantially identical volume and pressure.

References Cited in the file of this patent
UNITED STATES PATENTS

| | | |
|---|---|---|
| 1,748,004 | Urquhart | Feb. 18, 1930 |
| 1,958,094 | Ofeldt | May 8, 1934 |
| 2,075,589 | Munz | Mar. 30, 1937 |
| 2,207,758 | Rehse | July 16, 1940 |
| 2,259,215 | Scheurer | Oct. 14, 1941 |
| 2,269,901 | Bletcher et al. | Jan. 13, 1942 |
| 2,479,166 | Jenkins | Aug. 16, 1949 |
| 2,503,743 | Keefer | Apr. 11, 1950 |
| 2,600,040 | Widmayer | June 10, 1952 |
| 2,676,847 | Kelley | Apr. 27, 1954 |
| 2,760,821 | Kenney | Aug. 28, 1956 |
| 2,775,482 | Schutz | Dec. 25, 1956 |
| 2,808,294 | Tamminga | Oct. 1, 1957 |